United States Patent
Alvarez et al.

(10) Patent No.: US 10,353,727 B2
(45) Date of Patent: Jul. 16, 2019

(54) EXTENDING TRUSTED HYPERVISOR FUNCTIONS WITH EXISTING DEVICE DRIVERS

(71) Applicant: International Business Machines Corporation, Armonk, NY (US)

(72) Inventors: Juan J. Alvarez, Rochester, MN (US); Jesse P. Arroyo, Rochester, MN (US); Paul G. Crumley, Yorktown Heights, NY (US); Charles S. Graham, Rochester, MN (US); Joefon Jann, Ossining, NY (US); Timothy J. Schimke, Stewartville, MN (US); Ching-Farn E. Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/165,861

(22) Filed: May 26, 2016

(65) Prior Publication Data

US 2017/0344391 A1    Nov. 30, 2017

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45579* (2013.01); *G06F 2009/45587* (2013.01)

(58) Field of Classification Search
CPC ............... G06F 9/45558; G06F 9/5077; G06F 2009/45579
See application file for complete search history.

(56) References Cited

U.S. PATENT DOCUMENTS

| | | | |
|---|---|---|---|
| 7,574,709 B2 | 8/2009 | Erlingsson et al. |
| 8,249,853 B2 | 8/2012 | Jackson et al. |
| 8,327,353 B2 | 12/2012 | Traut |
| 8,561,065 B2 | 10/2013 | Cunningham et al. |
| 8,619,971 B2 | 12/2013 | Kurien et al. |
| 8,819,707 B2 | 8/2014 | Wu et al. |
| 9,736,166 B2 | 8/2017 | Riva et al. |

(Continued)

OTHER PUBLICATIONS

Dong et al., High Performance network virtualization with SR-IOV, J. Parallel Distrib. Comput., 2012 (Year: 2012).*

(Continued)

*Primary Examiner* — Francisco J Aponte
*Assistant Examiner* — Kevin X Lu
(74) *Attorney, Agent, or Firm* — Patterson + Sheridan, LLP (57) ABSTRACT

Systems, methods, and computer program products to perform an operation comprising executing a device driver in a private logical partition on a compute host, wherein the device driver is configured to execute in an environment different than an environment of a hypervisor of the compute host, establishing a communication channel between the private logical partition and an adjunct partition executing on the compute host, and configuring, responsive to a command sent by the adjunct partition to the device driver via the communication channel, a physical function of a single root I/O virtualization (SR-IOV) device of the host system.

17 Claims, 4 Drawing Sheets

(56) References Cited

U.S. PATENT DOCUMENTS

2010/0290467 A1* 11/2010 Eisenhauer ............ H04L 41/00
　　　　　　　　　　　　　　　　　　　　　　　370/392
2012/0297379 A1* 11/2012 Anderson ........... G06F 9/45558
　　　　　　　　　　　　　　　　　　　　　　　718/1
2013/0160002 A1*  6/2013 Graham .............. G06F 9/45558
　　　　　　　　　　　　　　　　　　　　　　　718/1

OTHER PUBLICATIONS

Weltzin, Casey, "Is Virtualization Right for your Application?" Embedded Systems Design 22.8, Sep. 20, 2009, 4 pages.

Tan, et al., "iKernel: Isolating Buggy and Malicious Device Drivers Using Hardware Virtualization Support," (DASC 2007), IEEE, 2007, 9 pages.

Waldspurger et al., "I/O Virtualization", Communications of the ACM, Jan. 2012, vol. 55, No. 1, pp. 66-72.

Ford et al., "The Flux OSKit: A Substrate for Kernel and Language Research," Appears in Proceedings of the 16th ACM Symposium on Operating Systems Principles, Oct. 1997, Saint-Malo, France © 1997 by ACM, Inc., 30 pages.

\* cited by examiner

EXTENDING TRUSTED HYPERVISOR FUNCTIONS WITH EXISTING DEVICE DRIVERS

BACKGROUND

The present invention relates to computing systems, and more specifically, to safely extending trusted hypervisor functions with existing device drivers.

Device drivers (also referred to drivers) are hardware-specific software which controls the operation of hardware devices connected to computing systems. To support new types of hardware devices in virtualized systems, operating system code and hypervisor code must be tailored to and enhanced for the particular type of hardware device and its driver. Without these modifications, the hardware device may not operate correctly in the system, and many system-specific functions (such as management, resource monitoring, and maintenance platforms) may not be supported. Often times, the device driver must be rewritten from scratch to add the device to a new environment.

These factors make the development of a common device driver that can be used across many environments impractical. The programmer skills, hardware details, and testing efforts required to create a properly functioning device driver conventionally require a significant investment of institutional resources and time. In many cases, without sufficiently detailed specifications for the hardware, the creation of a working device driver is practically impossible.

Existing device drivers, such as vendor-provided device drivers, control a device in the environment in which the driver is intended to operate in. However, using existing device drivers in environments other than those the device drivers were intended to operate in may have unwanted consequences, such as rendering the device unusable, causing system errors, exposing security vulnerabilities on the system, and undermining the stability of hardened services provided by a system.

In virtualized environments, multiple virtual machines (also referred to as logical partitions (LPARs)) may use the same physical I/O device, such as a network adapter. The hypervisor may isolate virtual machines, allowing a single virtual machine to access the physical I/O device at a time. To allow each virtual machine to use the same physical I/O device, the hypervisor may present a virtual device to each virtual machine. When a virtual machine performs I/O operations on the virtual device, the hypervisor can intercept (and queue) I/O requests by the virtual machine and pass the requested commands to the physical I/O device.

In some virtualized environments, a physical I/O device may allow multiple virtual machines to use the device concurrently through single root I/O virtualization (SR-IOV). In SR-IOV, a physical device may have physical functions (PFs) that allow for input/output and device configuration, as well as one or more virtual functions (VFs) that allow for data input/output. For example, an n-port network adapter may expose m VFs (e.g., one or more VFs for each port) that may be used by the virtual machines hosted on a computing system. A hypervisor on the host computing system may interact with the physical I/O device using the PFs, while each virtual machine can directly communicate with a portion of the physical I/O device using one or more VFs.

SUMMARY

In one embodiment, a method comprises executing a device driver in a private logical partition on a compute host, wherein the device driver is configured to execute in an environment different than an environment of a hypervisor of the compute host, establishing a communication channel between the private logical partition and an adjunct partition executing on the compute host, and configuring, responsive to a command sent by the adjunct partition to the device driver via the communication channel, a physical function of a single root I/O virtualization (SR-IOV) device of the host system.

In another embodiment, a system comprises a processor and a memory storing instructions, which when executed by the processor, performs an operation comprising executing a device driver in a private logical partition on a compute host, wherein the device driver is configured to execute in an environment different than an environment of a hypervisor of the compute host, establishing a communication channel between the private logical partition and an adjunct partition executing on the compute host, and configuring, responsive to a command sent by the adjunct partition to the device driver via the communication channel, a physical function of a single root I/O virtualization (SR-IOV) device of the host system.

In another embodiment, a computer-readable storage medium has computer-readable program code embodied therewith, the computer-readable program code executable by a processor to perform an operation comprising executing a device driver in a private logical partition on a compute host, wherein the device driver is configured to execute in an environment different than an environment of a hypervisor of the compute host, establishing a communication channel between the private logical partition and an adjunct partition executing on the compute host, and configuring, responsive to a command sent by the adjunct partition to the device driver via the communication channel, a physical function of a single root I/O virtualization (SR-IOV) device of the host system.

DETAILED DESCRIPTION

Embodiments disclosed herein provide a safe environment to run existing device driver code (e.g., vendor-provided device drivers), such that the device drivers can operate in conjunction with the components of virtualized platforms (such as hypervisors, virtual machines, and the like). More specifically, embodiments disclosed may run existing device drivers in a private logical partition, which is an isolated environment that exposes the device's functions to other components in the software stack while using isolation to prevent the existing device driver from having an adverse impact on the trusted parts of the hypervisor stack. Doing so allows the hypervisor to support new hardware devices without requiring the creation of new device drivers for each piece of hardware. In the event errors associated with the device driver are encountered, the private logical partition may be restarted to resolve the errors, while minimizing the impact on the system as a whole.

To use SR-IOV devices in a virtualized system, the hardware must be configured to create many PCI virtual functions (VFs). These VFs are then made available to the hypervisor for allocations to virtual machines. The code to manipulate the device hardware to create, configure, monitor, and destroy these VFs is operationally independent of the code which uses the VFs (e.g., an operating system and/or applications executing on a virtual machine). Some platforms, such as IBM's PowerVM hypervisor (PHYP) and its associated components (such as the Hardware Management Console (HMC)), are capable of dynamically adding and removing PCI devices in an operational system. As these devices are added to the system, they may be allocated to the virtual machines for dedicated access to each device. Embodiments disclosed herein use the private LPAR to run the device driver to dynamically create, destroy, manage, or otherwise modify the VFs for a particular device. Once these VFs are made available in the PCI configuration space, the existing hypervisor and HMC facilities can be added to add, allocate, deallocate, or remove the PCI virtual functions in the same manner which physical PCI devices are managed.

The private LPAR may execute several software components. In one embodiment, a Linux® kernel with special libraries to PCI and other resource access allows the device driver to use the normal means of controlling system resources (e.g., PCI configuration registers) in a way that can be isolated, to protect the system from unexpected software behavior. Furthermore, an additional application may execute in the application space of the private LPAR (or an operating system executing thereon) to control the operation of the device driver. This additional application may interact with the hypervisor and HMC to coordinate the flow of control for actions that require order for successful operation. In doing so, for example, the code that configures VFs in a PCI device will not be initiated until the HMC knows the device is physically present in the system, and an administrator has indicated that the device should be used in SR-IOV mode, rather than in a dedicated PCI device mode. This function may reuse the existing HMC, hypervisor, and adjunct structure that exist in the virtualized platform, with the PF adjunct communicating with the private LPAR through an internal communication channel as necessary.

The existing device driver code may be limited by the Linux kernel and the private LPAR, providing additional safeguards and protections to the system as a whole. The additional application running in the application space of the LPAR may control the device driver on behalf of the hypervisor and/or HMC, providing development cost and time to market savings.

Figure 1:
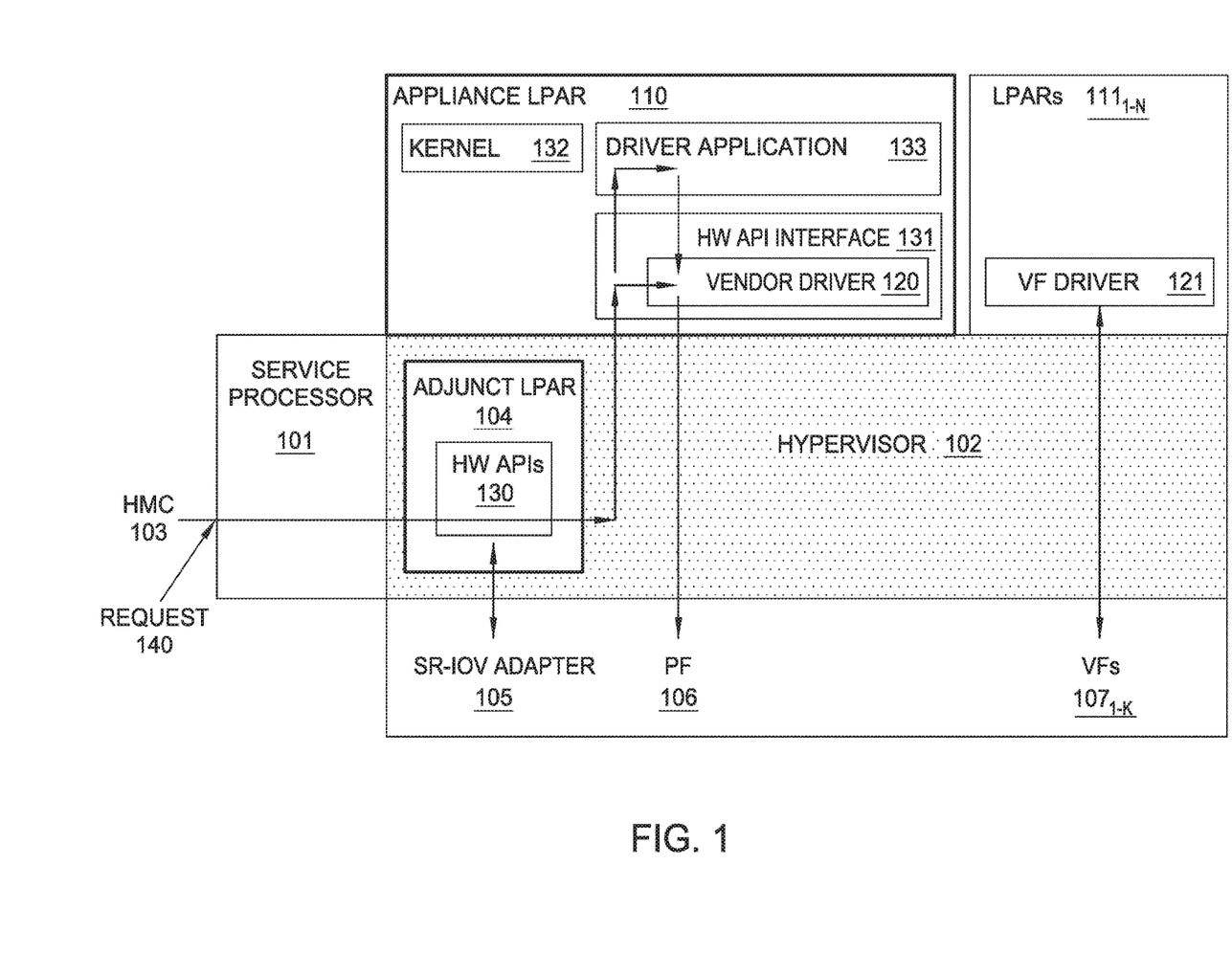
FIG. 1 illustrates an example system architecture which extends trusted hypervisor functions with existing device drivers, according to one embodiment.

FIG. 1 illustrates an example computing system architecture 100 which safely extends trusted hypervisor functions with existing device drivers, according to one embodiment. As illustrated, the computing system 100 includes a service processor 101, a hypervisor 102, hardware management console (HMC) 103, an adjunct LPAR 104, one or more SR-IOV adapters 105, an appliance logical partition (LPAR) 110, and one or more LPARs 111 (1-N). The service processor 101 is a dedicated central processing unit (CPU) which provides remote management capabilities of the system 100, allowing, for example, remote access, monitoring, and troubleshooting of the system 100. The hypervisor 102 generally provides operating system functionality (e.g., process creation and control, file system process threads, etc.) as well as CPU scheduling and memory management for the LPARs 111 managed by hypervisor 102. The HMC 103 provides a user interface to configure, manage, and operate the system 100. The LPARs $111_{1-N}$ each represent a subset of the hardware resources of the system 100, virtualized as a separate computing system which provides a container for a virtual machine (not pictured), where each virtual machine hosts its own operating system (not pictured). As shown, the LPARs $111_{1-N}$ include a VF driver 121 which allows applications, operating systems, and other components of the LPARs $111_{1-N}$ to use the VFs 107 of the SR-IOV adapter 105.

An SR-IOV adapter 105 is an input/output (I/O) device which can provide a variety of services and/or functionality to an operating system operating as a host on computing system 100 or LPARs 111. For example, SR-IOV adapters 105 may provide network connectivity functions to computing system 100, coprocessor functionality (e.g., graphics processing, encryption/decryption, database processing, etc.), and the like. The SR-IOV adapter 105 may interface with other components in computing system 100 via, for example, a PCI Express bus. In some cases, an SR-IOV adapter 105 may denote a single adapter function, but need not be the entire physical I/O adapter.

As shown, the SR-IOV adapter 105 may expose one or more physical functions (PFs) 106 to a host operating system (or hypervisor 102) and the appliance LPAR 110. Generally, the PFs 106 are PCIe functions that include SR-IOV extended capability, which facilitates the configuration, management, and sharing of the SR-IOV adapter 105. The SR-IOV adapter 105 also provides one or more virtual functions (VFs) $107_{1-K}$, which are lightweight PCIe functions that support SR-IOV. Each one of the VFs $107_{1-K}$ represents a virtualized instance of the SR-IOV adapter 105, and includes its own PCI configuration space. Each VF $107_{1-K}$ also shares one or more physical resources of the SR-IOV adapter 105 (such as a port of a network adapter) with the PF 106 and other VFs $107_{1-K}$. Once created, the hypervisor 102 may allocate the VFs $107_{1-K}$ to the LPARs $111_{1-N}$ (or virtual machines executing thereon).

The appliance LPAR 110 is a private logical partition that is used to run existing code, such as the vendor driver 120, which may not be fully compatible with the hypervisor 102. In at least one embodiment, the appliance LPAR 110 is a Linux partition hosting a Linux virtual machine. In such embodiments, the hypervisor 102 and the system 100 may not be Linux-based. The vendor driver 120 is a device driver for the SR-IOV adapter 105. In at least one embodiment, the vendor driver 120 is a device driver provided by the manufacturer of an SR-IOV adapter 105. As such, the vendor driver 120 may be pre-existing code that is configured to execute in an environment that may not be fully compatible with the hypervisor 102 (or other components of the system 100). In at least one embodiment, the vendor driver 120 is a Linux driver for the SR-IOV adapter 105.

The adjunct LPAR 104 is a logical partition that generally acts as the primary owner of an SR-IOV adapter 105 and a point of management for the SR-IOV adapter 105 (e.g., for error recovery operations). In some embodiments, the adjunct LPAR 104 may be a lightweight, hidden LPAR that hosts device drivers and provides other services to one or more of the LPARs $111_{1-N}$ hosted on computing system 100, but need not host an operating system or external-facing functionality. As shown, the adjunct LPAR 104 includes hardware (HW) application programming interfaces (APIs)

130. The HW APIs 130 are configured to provide an interface with the appliance LPAR 110 and the components therein. More generally, the HW APIs 130 are hardware independent versions of a PF driver that allows the adjunct LPAR 104 to control the PF 106 of the adapter 105. In at least one embodiment, the HW APIs 130 are an implementation of the Hypervisor Adjunct Development Environment (HADE) API, also referred to as a hardware encapsulation layer.

As shown, the appliance LPAR 110 also includes a HW API interface 131, a kernel 132, and a driver application 133. The driver application 133, as shown, facilitates communication between the HW APIs 130 of the adjunct LPAR 130, the vendor driver 120 of the HW API interface 131, and the PF 106. The HW API interface 131 provides a communication interface between the adjunct LPAR 104 and the appliance LPAR 110 (and the vendor driver 120). Generally, the HW API interface 131 is an implementation of APIs for a specific hardware adapter. Therefore, the APIs provided by the HW API interface 131 are hardware dependent. The APIs of the HW API interface 131 map from HW APIs 130 to the Linux PF interfaces of the vendor driver 120. The kernel 132 includes libraries to PCI/PCIe and other resource access to allow the vendor driver 120 to use its normal means of controlling the system resources (e.g., PCI configuration resources) in a way that can be isolated to protect the system 100 from unexpected software behavior. The driver application 133 executes in an application space and controls operation of the vendor driver 120. The driver application 133 interacts with the hypervisor 102 and the HMC 103 to coordinate the flow of control for actions that require order for successful operation. For example, the driver application 133 ensures that code that configures VFs in a PCI device (e.g., the SR-IOV adapter 105) is not initiated until the HMC 103 knows the device is physically present in the system 100 and that a system administrator has indicated that the device should be used in SR-IOV mode rather than in a dedicated PCI device mode.

Therefore, as shown, a user (or administrator) may issue a request 140 to use the SR-IOV adapter 105 in SR-IOV mode. The HW APIs 130 of the adjunct LPAR 104 may receive the request. The HW APIs 130 of the adjunct LPAR may forward the request 140 to the HW API interface 131 of the appliance LPAR 110. In at least one embodiment, the HW APIs 130 may translate the request into a command understood by the APIs of the HW API interface 131. The HW API interface 131 may communicate with the vendor driver 120, the driver application 133 and/or the kernel 132. The driver application 133, having received the command to use the adapter 105 in SR-IOV mode, may allow the vendor driver 120 to configure the PF 106 and VFs $107_{1-K}$ for the SR-IOV adapter 105. The hypervisor 102 may then allocate VFs $107_{1-K}$ to the LPARs $111_{1-N}$, and the VF drivers 121 of the LPARs $111_{1-N}$ may use the VFs $107_{1-K}$ of the adapter 105.

In contrast to conventional techniques, the system 100 shares ownership of the SR-IOV adapter 105 between two owners, namely the hypervisor 102 (via the adjunct LPAR 104) and the appliance LPAR 110 (via the vendor driver 120). Specifically, the appliance LPAR 110 and/or the adjunct LPAR 104 may configure the PF 106 and/or the VFs $107_{1-K}$ of the adapter 105 to reflect this shared ownership. Generally, configuration information for an SR-IOV adapter 105 includes, for example, configuration addresses, memory mapped I/O (MMIO) memory space information, direct memory access space information, and I/O device interrupt information for SR-IOV adapter 105. When computing system 100 operates (e.g., at boot time or when a new SR-IOV adapter 105 has been added to computing system 100), computing system 100 may create an assignable I/O unit (e.g., partitionable endpoint) that identifies SR-IOV adapter 105, the functionality exposed by SR-IOV adapter 105 (e.g., a physical function 106), and the memory and interrupt addresses to be used by computing system 100 (and/or LPARs 111 hosted on computing system 100).

Advantageously, the system 100 leverages existing facilities provided by the vendor driver 120 to manage device-specific properties of the adapter 105 in combination with the facilities provided by the hypervisor 102 and adjunct LPAR 104 to manage generic properties of the adapter 105 (e.g., properties applicable to all SR-IOV adapters). Furthermore, by executing the vendor driver 120 in the appliance LPAR 110, any negative consequences of executing untested (or possibly untrusted) code in the system 100 may be minimized. The code that is provided by the vendor in the vendor driver 120 can therefore be re-used without causing errors in the system 100.

Figure 2:
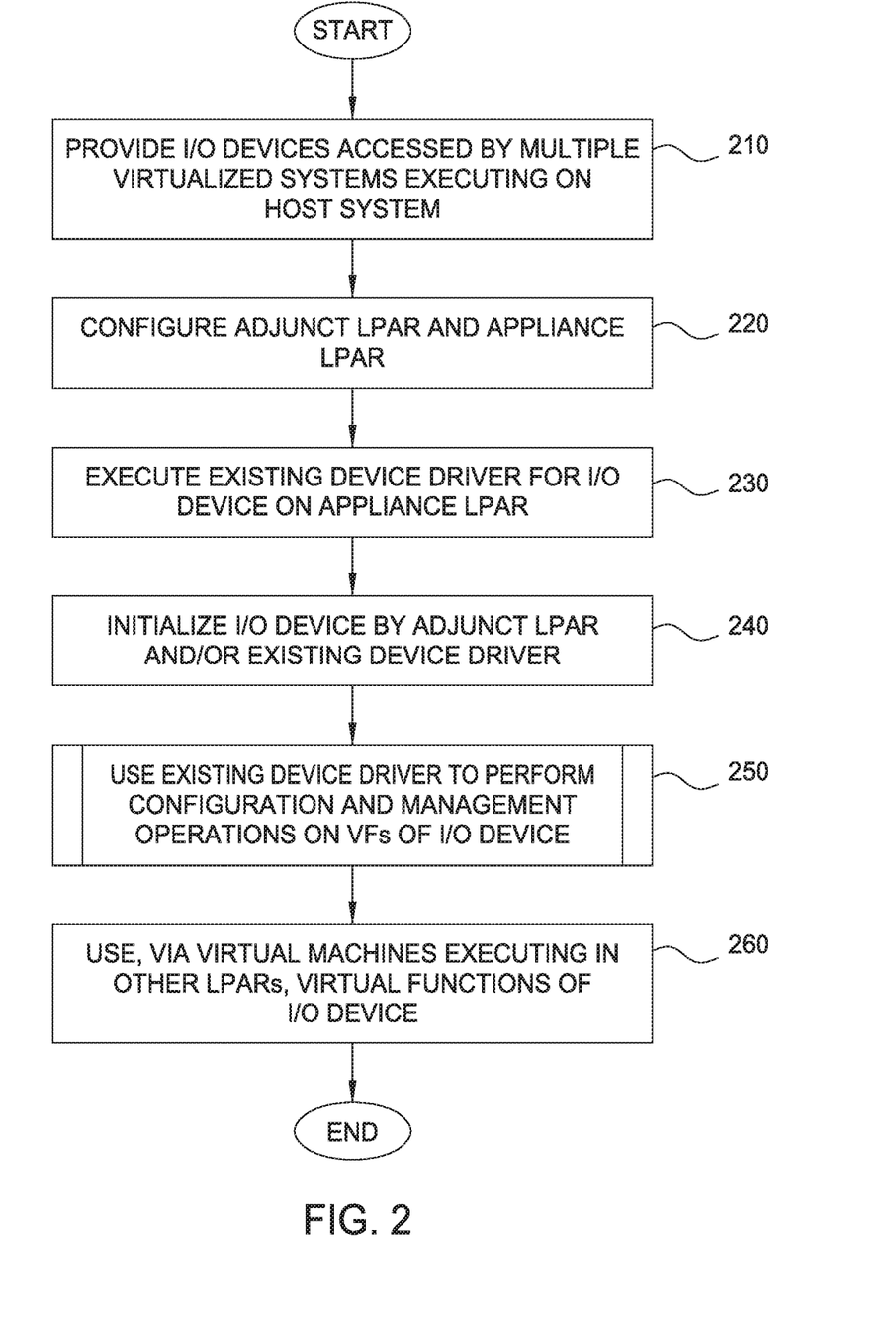
FIG. 2 is a flow chart illustrating an example method to extend trusted hypervisor functions with existing device drivers, according to one embodiment.

FIG. 2 is a flow chart illustrating a method 200 to safely extend trusted hypervisor functions with existing device drivers, according to one embodiment. As shown, the method 200 begins at block 210, where I/O devices accessed by multiple virtualized systems is provided in a host system. At block 220, the adjunct LPAR 104 and appliance LPAR 110 are configured. The configuration of the LPARs 104, 110 may include providing the APIs 130, 131, which provide a communication between the logical partitions 104, 110. Configuring the appliance LPAR 110 may further include configuring the kernel 132 and driver application 133. Doing so allows the vendor driver 120 to operate in an environment where it receives expected inputs, has a channel to provide expected outputs, and otherwise operate as generally intended. At block 230, an existing device driver, such as the vendor driver 120, is executed in the appliance LPAR 110. At block 240, the I/O device is initialized by one or more of the adjunct LPAR 104 and the vendor driver 120 of the appliance LPAR 110. Generally, at block 240, the PF of the I/O device is configured, along with any other required configuration information to use the device. At block 250, described in greater detail with reference to FIG. 3, the existing device driver (e.g., the vendor driver 120) is used to perform configuration and management operations on the VFs of the I/O device. At block 260, the virtual machines executing on the LPARs $111_{1-N}$ of the system may use the VFs of the I/O device. For example a web server executing in an LPAR $111_1$ may use the VF $107_1$ of a network adapter via a VF driver 121 to serve data to users via a network.

Figure 3:
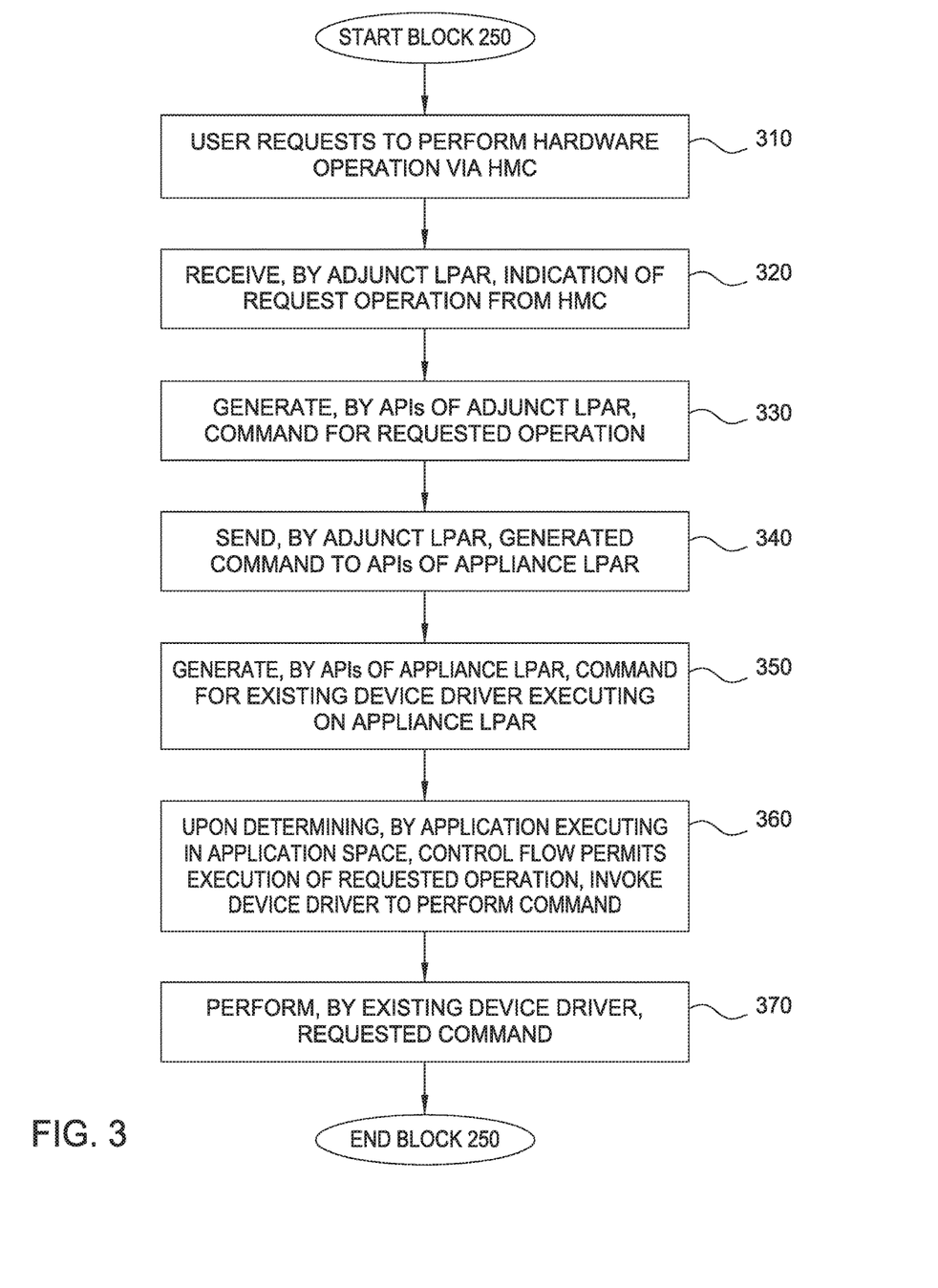
FIG. 3 is a flow chart illustrating an example method to use an existing device driver to perform configuration and management operations on the VFs of an I/O device, according to one embodiment.

FIG. 3 is a flow chart illustrating a method 300 corresponding to block 250 to use an existing device driver to perform configuration and management operations on the VFs of an I/O device, according to one embodiment. As shown, the method 300 begins at block 310, where a user requests to perform a hardware operation via the HMC 103. Example requests include a request to use a device in SR-IOV mode, a request to configure the device, and the like. At block 320, the adjunct partition 104 may receive an indication of the requested operation from the HMC 103. At block 330, the HW APIs 130 of the adjunct partition 104 may generate a command corresponding to the requested operation. In at least one embodiment, the generated command may map commands specific to the HMC 103 and/or hypervisor 102 to a command understood by the vendor driver 120. At block 340, the adjunct partition 104 may send the command generated at block 330 to the APIs of the appliance LPAR 110. At block 350, the APIs 131 of the appliance LPAR 110 may optionally generate a command for the existing device driver (e.g., the device driver 120) executing on the appliance LPAR 110. However, if the command received by the APIs 131 is understood by the device driver 120, the APIs 131 need not generate a new command, but may rather invoke the device driver 120 to execute the command. At block 360, the driver application 133 may determine whether the current control flow permits execution of the requested operation. If the control flow permits execution of the requested operation, the APIs 131 may invoke the device driver 120 to execute the command. If the control flow does not control flow permit execution of the requested operation, the driver application 133 may restrict performance of the requested operation. If the control flow permits execution of the requested operation, the device driver may perform the requested operation at block 370.

Figure 4:
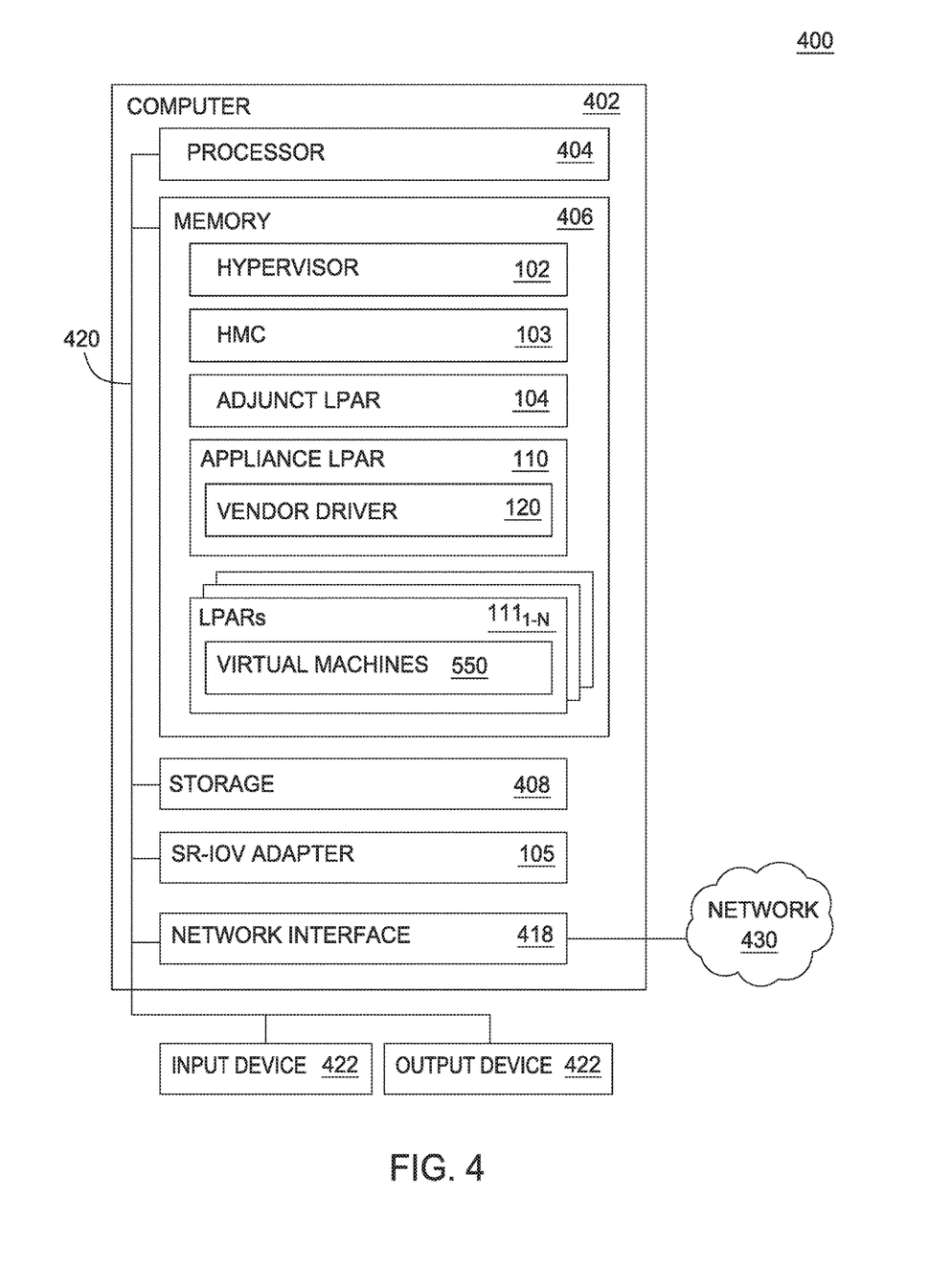
FIG. 4 illustrates an example system which extends trusted hypervisor functions with existing device drivers, according to one embodiment.

FIG. 4 illustrates an example system 400 which safely extends trusted hypervisor functions with existing device drivers, according to one embodiment. The networked system 400 includes a computer 402. The computer 402 may also be connected to other computers via a network 430. In general, the network 430 may be a telecommunications network and/or a wide area network (WAN). In a particular embodiment, the network 430 is the Internet.

The computer 402 generally includes a processor 404 which obtains instructions and data via a bus 420 from a memory 406 and/or a storage 408. The computer 402 may also include one or more network interface devices 418, input devices 422, and output devices 424 connected to the bus 420. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is a programmable logic device that performs instruction, logic, and mathematical processing, and may be representative of one or more CPUs. The network interface device 418 may be any type of network communications device allowing the computer 402 to communicate with other computers via the network 430.

The storage 408 is representative of hard-disk drives, solid state drives, flash memory devices, optical media and the like. Generally, the storage 408 stores application programs and data for use by the computer 402. In addition, the memory 406 and the storage 408 may be considered to include memory physically located elsewhere; for example, on another computer coupled to the computer 402 via the bus 420.

The input device 422 may be any device for providing input to the computer 402. For example, a keyboard and/or a mouse may be used. The input device 422 represents a wide variety of input devices, including keyboards, mice, controllers, and so on. Furthermore, the input device 422 may include a set of buttons, switches or other physical device mechanisms for controlling the computer 402. The output device 424 may include output devices such as monitors, touch screen displays, and so on.

As shown, the memory 406 contains the hypervisor 102, the HMC 103, the adjunct LPAR 104, the appliance LPAR 110, and the LPARs 111$_{1-N}$. Generally, the computer 402 is configured to perform all functionality described herein. More specifically, the appliance LPAR 110 is configured to execute the vendor driver 120, which controls the configuration of the SR-IOV adapter 105 in conjunction with the hypervisor 102 and adjunct LPAR 104. By executing the vendor driver 120 in the appliance LPAR 110, any errors caused by the vendor driver 120 are less likely to affect the computer 402 as a whole. Doing so allows device drivers that are untested or unsupported to be reused in other systems with confidence that the systems will not be adversely affected.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

While the foregoing is directed to embodiments of the present invention, other and further embodiments of the invention may be devised without departing from the basic scope thereof, and the scope thereof is determined by the claims that follow.

What is claimed is:

1. A method, comprising:
executing a device driver in a private logical partition on a compute host, wherein the device driver is configured to execute in an environment different than an environment of a hypervisor of the compute host;
establishing a communication channel between the private logical partition and an adjunct partition executing on the compute host;
receiving, by an application programming interface (API) of the adjunct logical partition, a request to configure a physical function of a single root I/O virtualization (SR-IOV) device of the compute host;
translating, by the API of the adjunct logical partition, the request to a command compatible with an API of the private logical partition;
providing, by the API of the private logical partition, the translated command received from the API of the adjunct logical partition to the device driver;
responsive to receiving the translated command, determining by a driver application, whether a control flow permits configuration of the physical function of the SR-IOV device; and
upon determining the control flow permits configuration of the physical function, configuring, by the device driver, the physical function of the SR-IOV device.

2. The method of claim 1, further comprising:
creating, by the device driver, a virtual function of the SR-IOV device; and
allocating, by the hypervisor, the virtual function of the SR-IOV device to one of a plurality of virtual machines executing on the host.

3. The method of claim 2, further comprising:
using the virtual function of the SR-IOV device by a device driver executing on the one of the plurality of virtual machines executing on the host.

4. The method of claim 1, wherein the API of the private logical partition is configured to invoke the device driver to configure the physical function of the SR-IOV device of the host system.

5. The method of claim 1, wherein ownership of the SR-IOV device is shared by the adjunct partition and the device driver.

6. The method of claim 1, wherein a user specifies to configure the physical function of the SR-IOV device via a hardware management console (HMC), wherein the HMC is configured to:
generate an indication of the request to configure the physical function of the SR-IOV device; and
transmit the indication of the request to the adjunct partition.

7. A computer program product, comprising:
a computer-readable storage medium having computer readable program code embodied therewith, the computer readable program code executable by a processor to perform an operation comprising:
executing a device driver in a private logical partition on a compute host, wherein the device driver is configured to execute in an environment different than an environment of a hypervisor of the compute host;
establishing a communication channel between the private logical partition and an adjunct partition executing on the compute host;
receiving, by an application programming interface (API) of the adjunct logical partition, a request to configure a physical function of a single root I/O virtualization (SR-IOV) device of the compute host;
translating, by the API of the adjunct logical partition, the request to a command compatible with an API of the private logical partition;
providing, by the API of the private logical partition, the translated command received from the API of the adjunct logical partition to the device driver;
responsive to receiving the translated command, determining by a driver application, whether a control flow permits configuration of the physical function of the SR-IOV device; and
upon determining the control flow permits configuration of the physical function, configuring, by the device driver, the physical function of the SR-IOV device.

8. The computer program product of claim 7, the operation further comprising:
creating, by the device driver, a virtual function of the SR-IOV device; and
allocating, by the hypervisor, the virtual function of the SR-IOV device to one of a plurality of virtual machines executing on the host.

9. The computer program product of claim 8, the operation further comprising:
using the virtual function of the SR-IOV device by a device driver executing on the one of the plurality of virtual machines executing on the host.

10. The computer program product of claim 7, wherein the API of the private logical partition is configured to invoke the device driver to configure the physical function of the SR-IOV device of the host system.

11. The computer program product of claim 7, wherein ownership of the SR-IOV device is shared by the adjunct partition and the device driver.

12. The computer program product of claim 7, wherein a user specifies to configure the physical function of the SR-IOV device via a hardware management console (HMC), wherein the HMC is configured to:
generate an indication of the request to configure the physical function of the SR-IOV device; and
transmit the indication of the request to the adjunct partition.

13. A system, comprising:
a processor; and
a memory storing one or more instructions which, when executed by the processor, performs an operation comprising:
executing a device driver in a private logical partition on a compute host, wherein the device driver is configured to execute in an environment different than an environment of a hypervisor of the compute host;
establishing a communication channel between the private logical partition and an adjunct partition executing on the compute host;
receiving, by an application programming interface (API) of the adjunct logical partition, a request to configure a physical function of a single root I/O virtualization (SR-IOV) device of the compute host;
translating, by the API of the adjunct logical partition, the request to a command compatible with an API of the private logical partition;

providing, by the API of the private logical partition, the translated command received from the API of the adjunct logical partition to the device driver;

responsive to receiving the translated command, determining by a driver application, whether a control flow permits configuration of the physical function of the SR-IOV device; and upon determining the control flow permits configuration of the physical function, configuring, by the device driver, the physical function of the SR-IOV device.

14. The system of claim 13, the operation further comprising:

creating, by the device driver, a virtual function of the SR-IOV device; and allocating, by the hypervisor, the virtual function of the SR-IOV device to one of a plurality of virtual machines executing on the host.

15. The system of claim 14, the operation further comprising:

using the virtual function of the SR-IOV device by a device driver executing on the one of the plurality of virtual machines executing on the host.

16. The system of claim 13, wherein the API of the private logical partition is configured to invoke the device driver to configure the physical function of the SR-IOV device of the host system.

17. The system of claim 13, wherein ownership of the SR-IOV device is shared by the adjunct partition and the device driver, wherein a user specifies to configure the physical function of the SR-IOV device via a hardware management console (HMC), wherein the HMC is configured to:

generate an indication of the request to configure the physical function of the SR-IOV device; and transmit the indication of the request to the adjunct partition.

* * * * *